United States Patent
Zivcec et al.

(10) Patent No.: US 11,148,359 B2
(45) Date of Patent: Oct. 19, 2021

(54) METHOD FOR LAYERED PRODUCTION OF A COMPONENT FROM A POWDERY MATERIAL

(71) Applicant: Hilti Aktiengesellschaft, Schaan (LI)

(72) Inventors: Maria Zivcec, Buchs (CH); Robert Spring, Fruemsen (CH); Roland Schneider, Schlins (AT)

(73) Assignee: Hilti Aktiengesellschaft, Schaan (LI)

( * ) Notice: Subject to any disclaimer, the term of this patent is extended or adjusted under 35 U.S.C. 154(b) by 204 days.

(21) Appl. No.: 16/471,631

(22) PCT Filed: Nov. 29, 2017

(86) PCT No.: PCT/EP2017/080761
§ 371 (c)(1),
(2) Date: Jun. 20, 2019

(87) PCT Pub. No.: WO2018/114254
PCT Pub. Date: Jun. 28, 2018

(65) Prior Publication Data
US 2020/0122390 A1    Apr. 23, 2020

(30) Foreign Application Priority Data
Dec. 22, 2016   (EP) .................... 16206210

(51) Int. Cl.
*B29C 64/165*  (2017.01)
*B22F 10/14*  (2021.01)
(Continued)

(52) U.S. Cl.
CPC ............ *B29C 64/153* (2017.08); *B22F 10/14* (2021.01); *B28B 1/001* (2013.01); *B29C 64/165* (2017.08);
(Continued)

(58) Field of Classification Search
CPC ..... B28B 1/001; B29C 64/165; B29C 64/106; B22F 10/10; B22F 10/14
See application file for complete search history.

(56) References Cited

U.S. PATENT DOCUMENTS

| | | | |
|---|---|---|---|
| 2014/0053956 A1 | 2/2014 | Etter et al. | |
| 2015/0037498 A1 | 2/2015 | Bruck et al. | |
| 2015/0314530 A1* | 11/2015 | Rogren .................. | B33Y 30/00 264/131 |

FOREIGN PATENT DOCUMENTS

| | | |
|---|---|---|
| CN | 103624257 | 3/2014 |
| CN | 105886923 | 8/2016 |

(Continued)

OTHER PUBLICATIONS

International Search Report of PCT/EP2017/080761, dated May 2, 2018.

*Primary Examiner* — Mary Lynn F Theisen
(74) *Attorney, Agent, or Firm* — Davidson, Davidson & Kappel, LLC

(57) ABSTRACT

A method for the layered production of a component (10) from powdery material including loose powder particles, based on three-dimensional data of the component (10), including the method steps: the component (10) is segmented in a building direction (16) into N, N≥2 consecutive, cylindrical cross-sectional areas (11, 12, 13, 14, 15) made up of a two-dimensional cross-sectional surface and a layer thickness; N powder layers of the powdery material are applied to a building plane perpendicular to the building direction (16); the loose powder particles in the cross-sectional areas (11, 12, 13, 14, 15) of the component (10) are at least partially bonded to each other and to the underlying cross-sectional area and; loose powder particles arranged within one cross-sectional area or within multiple consecutive cross-sectional areas in the building direction (16) are at (Continued)

least partially removed from the component (10) during the layered production of the component (10).

17 Claims, 8 Drawing Sheets

(51) Int. Cl.
    *B28B 1/00*     (2006.01)
    *B33Y 10/00*     (2015.01)
    *B29C 64/153*     (2017.01)
    *B29C 64/245*     (2017.01)
    *B29C 64/40*     (2017.01)

(52) U.S. Cl.
    CPC ............ *B29C 64/245* (2017.08); *B29C 64/40* (2017.08); *B33Y 10/00* (2014.12)

(56) References Cited

FOREIGN PATENT DOCUMENTS

| | | |
|---|---|---|
| EP | 0 452 618 A1 | 10/1991 |
| EP | 2947274 | 11/2015 |
| JP | 2000190086 A | 7/2000 |
| JP | 2003001715 A | 1/2003 |
| WO | WO2013030064 | 3/2013 |

\* cited by examiner

US 11,148,359 B2

METHOD FOR LAYERED PRODUCTION OF A COMPONENT FROM A POWDERY MATERIAL

TECHNICAL FIELD

The present invention relates to a method for the layered production of a component from powdery material.

BACKGROUND

Abrasive processing tools, such as drill bits, saw blades, cutting wheels or grinding wheels, include processing segments which are fastened to a tubular or disk-shaped base body. Depending on the processing method of the abrasive processing tool, the processing segments are referred to as drilling segments, sawing segments, cutting segments or grinding segments and combined under the term "processing segments". The processing segments are constructed from a powdery material and cutting elements in the form of hard material particles. A distinction is made between processing segments having statistically distributed hard material particles and processing segments having hard material particles arranged in a defined manner. In processing segments having statistically distributed hard material particles, the powdery material and the hard material particles are mixed and filled into a suitable tool mold and initially formed into a green body with the aid of cold pressing. In processing segments having hard material particles arranged in a defined manner, the green body is constructed in layers from a powdery material, into which the hard material particles are placed in defined positions. In the case of statistically distributed hard material particles and hard material particles arranged in a defined manner, the green bodies are compressed into usable processing segments by hot pressing and/or sintering.

Processing segments having statistically distributed hard material particles have multiple disadvantages. Since the hard material particles are also arranged on the surface of the green bodies, the tool molds needed for cold pressing the green bodies have a high degree of wear. In addition, the distribution of the hard material particles in the green body does not correspond to the optimal distribution for application purposes. The disadvantages of processing segments having statistically distributed hard material particles result in that processing segments having hard material particles arranged in a defined manner are overwhelmingly used for high quality processing tools, despite the higher costs.

EP 0 452 618 A1 describes a known method for the layered production of a green body from a powdery material, including hard material particles arranged in defined positions in the powdery material. The known method is based on three-dimensional data of the green body and includes the following method steps:

The green body is segmented in a building direction into N, N≥2 consecutive cylindrical cross-sectional areas, each cross-sectional area being formed from a two-dimensional cross-sectional surface perpendicular to the building direction and a layer thickness in parallel to the building direction.

N, N≥2 powder layers of the powdery material are applied to a building plane, which is arranged perpendicularly to the building direction.

The hard material particles are arranged in the defined positions in the powdery material.

The hard material particles are taken up with the aid of a suction plate and positioned over the layer structure. By reducing the suction force or with the aid of a short compressed air blast, the hard material particles detach from the suction plate and are placed into the upper powder layer of the layer structure. The compressed air blast may be only so strong that the powdery material is not displaced and the hard material particles are arranged in the provided defined positions of the distribution. Another disadvantage is that the hard material particles are arranged only loosely on or in the upper powder layer. Upon applying and distributing the next powder layer of the powdery material with the aid of an application tool in the form of a roller, a scraper or a brush, the hard material particles may be displaced from their defined positions by the application tool, and the accuracy may thus be reduced.

In addition to the layered production of green bodies for processing segments, methods for the layered production of components from powdery material are also known. The known methods for the layered production of a component from powdery material including loose powder particles are based on three-dimensional data of the component and include the following method steps:

The component is segmented in a building direction into N, N≥2 consecutive cylindrical cross-sectional areas, each cross-sectional area being formed from a two-dimensional cross-sectional surface perpendicular to the building direction and a layer thickness in parallel to the building direction;

A first powder layer of the powdery material is applied to a building plane perpendicularly to the building direction;

The loose powder particles of the first powder layer are at least partially bonded to each other in the first cross-sectional area of the component;

Additional powder layers of the powdery material are applied consecutively to the building plane in the building direction of the component; and In each additional powder layer, the loose powder particles in the particular cross-sectional area of the component are at least partially bonded to each other and to the underlying cross-sectional area of the component.

SUMMARY OF THE INVENTION

It is an object of the present invention to improve the integration of insert elements into components manufactured in layers. The integration of the insert elements is to take place in a largely automated manner during the layered production of the component, and the insert elements are to be integrated into the component with a high degree of accuracy.

The present invention provides a method for the layered production of a component from powdery material characterized in that loose powder particles which are arranged within a cross-sectional area or within multiple consecutive cross-sectional areas in the building direction are at least partially removed from the component during the layered production of the component. The removal of the loose powder particles from the component may take place, for example, by suction or by blowing out. Due to the fact that loose powder particles are at least partially removed from the component during the layered production of the component, cavities or support structures may be created in the component, into which the insert elements may be inserted. The insert elements are integrated into the component during the layered production of the component.

Components produced in layers with the aid of the method according to the present invention are made up of multiple consecutive, cylindrical cross-sectional areas including a two-dimensional cross-sectional surface perpendicular to the building direction and a layer thickness in parallel to the building direction, the cross-sectional areas being formed as straight cylinders including an arbitrary cross-sectional surface. The outer lateral surface of the cylindrical cross-sectional areas separates the area "inside the component" from the area "outside the component." Loose powder particles, which are arranged within the outer lateral surface of a cross-sectional area or within the outer lateral surfaces of multiple cross-sectional areas during the layered production of the component, are at least partially removed from the component during the layered production.

The method according to the present invention for the layered production of a component is suitable for powdery materials, which are also referred to as material powder. All materials which are solid in the initial state and are made from loose, i.e. non-bonded, powder particles, are combined under the term "powdery materials." Powdery materials may be made up of a material powder or be composed of a mixture of different material powders.

In one preferred refinement of the method, setting areas for insert elements are defined in the component, and loose powder particles of the powdery material surrounding the setting areas are bonded to each other. The powder particles of the powdery material surrounding the setting areas are bonded to each other and separate the setting areas for the insert elements from the rest of the component. To integrate insert elements into a component manufactured in layers, setting volumes are defined for the insert elements, which, like the component, are segmented into one setting area or into multiple consecutive setting areas. To remove only the loose powder particles in the area of the setting volumes, the setting volumes are separated from the surrounding component by cavities or closed support structures. The powder particles of the powdery material which are bonded to each other form cavities or closed support structures and facilitate an at least partial removal of the powdery material. The cavities or closed support structures reduce the risk of the insert elements being displaced upon the application of another powder particle layer of the powdery material and make it possible to integrate the insert elements into the component with a high degree of accuracy.

All elements, which may be integrated into a component, are combined under the term "insert elements". This includes, among other things, cutting elements, sensor elements, material fillings and placeholder elements. All cutting means for abrasive processing segments are combined under the term "cutting elements". This includes, in particular, individual hard material particles (particles of hard materials), composite parts made up of multiple hard material particles and coated or encapsulated hard material particles. Hard materials are characterized by a special hardness. Hard materials may be divided into natural and synthetic hard materials, on the one hand, and into metallic and nonmetallic hard materials, on the other hand. The natural hard materials include, among other things, natural diamonds, corundum and other hard minerals, and the synthetic hard materials include, among other things, synthetic diamonds, high-melting carbides, borides, nitrides and silicides. The metallic hard materials include, among other things, the high-melting carbides, borides, nitrides and silicides of the transition metals of the fourth through the sixth group of the periodic system, and the nonmetallic hard materials include, among other things, diamond, corundum, other hard minerals, silicon carbide and boron carbide.

In a first variant of the method, cavities for the insert elements are constructed in layers in the component, and the insert elements are placed within the cavities during the layered production. The insert elements are placed into the cavities, which prevent the insert elements from being displaced upon the application of another powder layer of the powdery material, so that the defined positions of the insert elements may be maintained during the layered construction with a high degree of accuracy.

In addition to the setting areas, material areas are particularly preferably defined for the cross-sectional areas of the component which include the setting areas, and material areas are defined for the cross-sectional areas of the component which do not include any setting areas, the loose powder particles of the powdery material being bonded to each other in the material areas, and the material areas delimiting the cavities for the insert elements. Due to the fact that the powder particles of the powdery material are bonded to each other in the material areas, the setting areas for the insert elements are delimited by the cylindrical lateral surfaces of the material areas, and the loose powder particles in the setting areas may be removed from the component. The cylindrical lateral surfaces of the material areas form the cavities and surround the setting areas for the insert elements. At least one insert element is arranged in each cavity of the component, which has the necessary insert height. One insert element, multiple identical insert elements or different insert elements may be arranged in a cavity.

The construction of cavities within the scope of the first variant of the method has the advantage that the powder particles of the powdery material are bonded to each other outside the cavities, and an unintentional removal of powdery material from the material areas is thus not possible. However, the complete bonding of the powder particles in the material areas requires a great manufacturing complexity and increases the share of undesirable additional constituents, for example in the form of an adhesive or binding agent. Undesirable additional constituents in a component designed as a green body must be removed in a subsequent compression process with the aid of hot pressing and/or sintering. If the additional constituents cannot be completely removed, the quality of the compressed component may suffer.

Loose powder particles of the powdery material are particularly preferably at least partially removed from a cavity when the cavity has a necessary insert height for placing the insert elements. The necessary insert height of the cavities is dependent, among other things, on the type and size of the insert elements. In addition, the necessary insert height of the cavities for identical insert elements may be different within the component, and it may depend on the spatial placement of the insert elements in the component. At least one insert element is placed into each cavity which has the necessary insert height. One insert element, multiple identical insert elements or different insert elements may be arranged in a cavity.

After the powdery material has been at least partially removed from a cavity, the cavity may be filled with a special material or an adhesive. The use of a special material is useful if the component manufactured in layers is subjected to a subsequent processing by hot pressing and/or sintering for compression purposes, and the insert elements become damaged during hot pressing and/or sintering, due to the powdery material. The use of an adhesive is useful if insert elements have an orientation and are to be placed into the cavity in the right orientation.

In a second variant of the method, closed support structures for the insert elements are constructed in layers in the component, and the insert elements are placed within the support structures during the layered production. A support structure is referred to as closed if the support structure has a closed circumference in the building plane of the component, and the setting area is completely surrounded by the support structure. The insert elements are placed into the support structures, which prevent the insert elements from being displaced upon the application of another powder layer of the powdery material, so that the defined positions of the insert elements may be maintained during the layered construction with a high degree of accuracy. The construction of closed support structures within the scope of the second variant of the method has the advantage over the first variant of the method that the production complexity for creating the support structures, and the share of undesirable additional constituents, for example in the form of an adhesive or binding agent, is reduced in material areas, compared to cavities.

Support rings are particularly preferably defined for the cross-sectional areas of the component which include the setting areas, the setting rings surrounding the setting areas. The support rings form the closed support structures for the insert elements, the support structures being formed from one support ring or multiple consecutive support rings in the building direction. All closed cross-sectional shapes are suitable as cross-sectional shapes for the support rings, the cross-sectional shape being adapted, in particular to the geometry of the insert elements.

Components manufactured in layers, which have closed support structures for the insert elements, must be removed from the machine after the layered construction. The outer geometry of the component must therefore be closed at least on the underside and the sides to prevent the powdery material from emerging. The cross-sectional areas of the component include at least one outer cylindrical lateral surface, which is also referred to as the outer lateral surface. In components having inner recesses, the cross-sectional areas additionally include one or multiple inner cylindrical lateral surfaces, which are also referred to as inner lateral surfaces. Limiting rings are defined for the outer and inner lateral surfaces of the component, the limiting rings of the outer lateral surfaces being referred to as outer limiting rings or outer rings, and the limiting rings of the inner lateral surfaces being referred to as inner limiting rings or inner rings. "Outer limiting rings" as well as "inner limiting rings" are combined under the term "limiting ring". The outer limiting rings have outer geometries which correspond to the outer lateral surfaces of the cross-sectional areas, and the inner limiting rings have inner geometries which correspond to the inner lateral surfaces of the cross-sectional areas.

Loose powder particles of the powdery material are particularly preferably at least partially removed from a support structure when the support structure has a necessary insert height for placing the insert elements. The necessary insert height of the support structures is dependent, among other things, on the type and size of the insert elements. In addition, the necessary insert height of the support structures for identical insert elements may be different within the component, and it may depend on the spatial placement of the insert elements in the component. At least one insert element is placed into each support structure which has the necessary insert height. One insert element, multiple identical insert elements or different insert elements may be placed into a support structure.

After the powdery material has been at least partially removed from a support structure, the support structure may be filled with a special material or an adhesive. The use of a special material is useful if the component manufactured in layers is subjected to a subsequent processing by hot pressing and/or sintering for compression purposes, and the insert elements become damaged during hot pressing and/or sintering, due to the powdery material. The use of an adhesive is useful if insert elements have an orientation and are to be placed into the support structure in the right orientation.

BRIEF DESCRIPTION OF THE DRAWINGS

Exemplary embodiments of the present invention are described below on the basis of the drawing. The latter is not necessarily intended to represent the exemplary embodiments true to scale but rather the drawing is presented in a schematic and/or slightly distorted form where useful for the purpose of explanation. It should be taken into account that a variety of modifications and changes relating to the form and detail of a specific embodiment may be undertaken without deviating from the general idea of the present invention. The general idea of the present invention is not limited to the exact form or the detail of the preferred specific embodiment illustrated and described below, nor is it limited to an object which would be limited in comparison to the object claimed in the claims. In given design areas, values within the specified limits are also to be disclosed as limiting values and be able to be arbitrarily used and claimed. For the sake of simplicity, the same reference numerals are used below for identical or similar parts or for parts having identical or similar functions.

DETAILED DESCRIPTION

Figure 1:
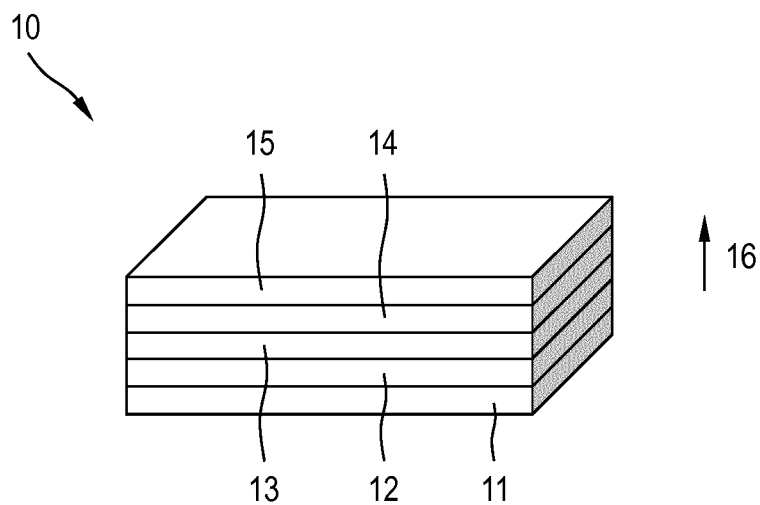
FIG. 1 shows a first component, which is manufactured from five cylindrical cross-sectional areas arranged one above the other in a building direction with the aid of the method according to the present invention for the layered production.

FIG. 1 shows a component 10 designed as a cuboid, which is manufactured with the aid of the method according to the present invention for the layered production of a component from a powdery material, including insert elements arranged in a defined manner, and which is referred to below as first component 10. First component 10 is manufactured in a layer structure from five cylindrical cross-sectional areas 11, 12, 13, 14, 15 arranged one above the other, which are stacked on top of each other in a building direction 16. Cylindrical cross-sectional areas 11 through 15 have a layer thickness $d_i$, i=1 through 5 in parallel to building direction 16 and a two-dimensional cross-sectional surface perpendicular to building direction 16. Layer thicknesses $d_i$, i=1 through 5 may be uniform, or individual cross-sectional areas 11 through 15 have different layer thicknesses.

Figure 2A:
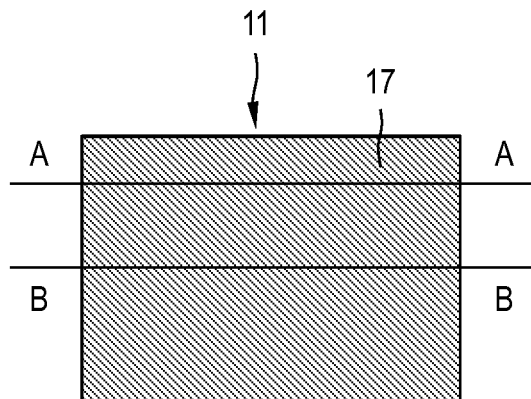
FIGS. 2A through 2E show the five cross-sectional areas of the first component from FIG. 1, which are made up of a two-dimensional cross-sectional surface perpendicular to the building direction and a layer thickness in parallel to the building direction.
Figure 2B:
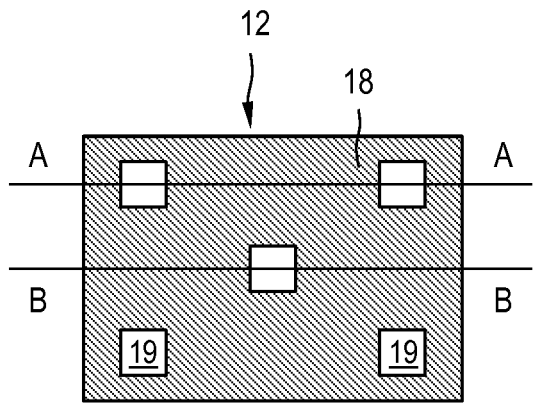
Figure 2C:
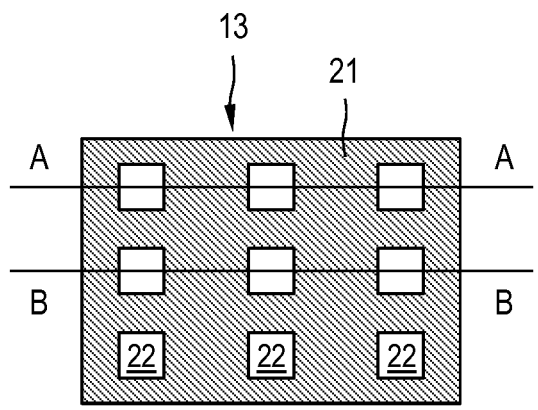
Figure 2D:
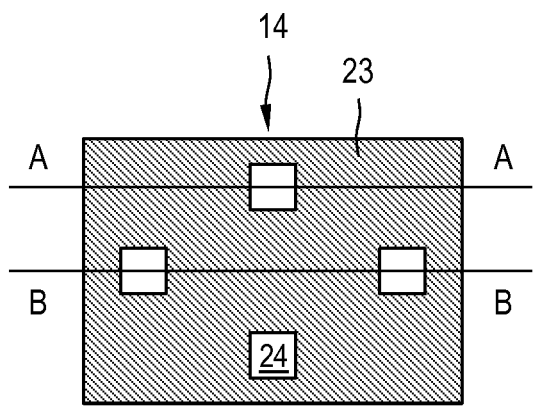
Figure 2E:
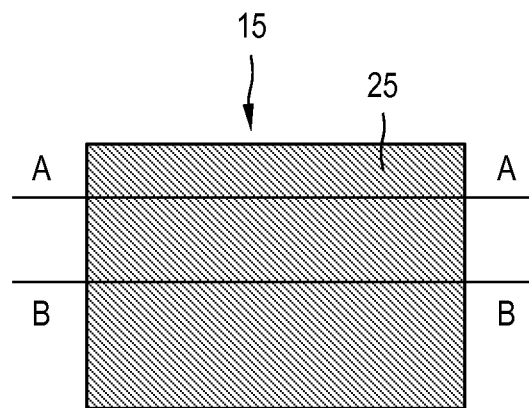

To be able to manufacture first component 10 in the layer structure, cuboid 10 is segmented in building direction 16 into five cylindrical cross-sectional areas 11 through 15, which are illustrated in FIGS. 2A through 2E. FIG. 2A shows first cross-sectional area 11, FIG. 2B shows second cross-sectional area 12, FIG. 2C shows third cross-sectional area 13, FIG. 2D shows fourth cross-sectional area 14, and FIG. 2E shows fifth cross-sectional area 15. Each cross-sectional area 11 through 15 of first component 10 includes one or multiple material areas, which are manufactured from powdery material and may have one or multiple setting areas. The setting areas form cavities for insert elements, which are to be placed into first component 10. The cavities may be made up of one setting area or multiple consecutive setting areas in building direction 16.

To distinguish between the material areas and the setting areas, the material areas of the ith cross-sectional area are referred to as ith material areas, and the setting areas of the ith cross-sectional area are referred to as ith setting areas. First cross-sectional area 11 includes a first material area 17, second cross-sectional area 12 includes a second material area 18 and five setting areas 19, third cross-sectional area 13 includes a third material area 21 and nine third setting areas 22, fourth cross-sectional area 14 includes a fourth material area 23 and four fourth setting areas 24, and fifth cross-sectional area 15 includes a fifth material area 25.

Figure 3A:
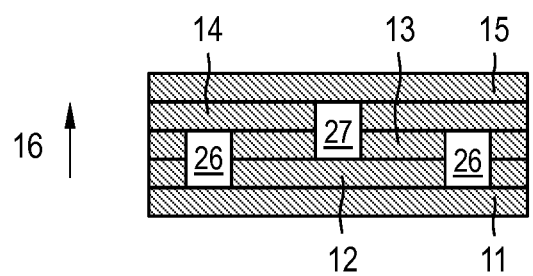
FIGS. 3A, 3B show a first and a second cross section of the first component from FIG. 1 in parallel to the building direction along section planes A-A in FIGS. 2A through 2E (FIG. 3A) and along section planes B-B in FIGS. 2A through 2E (FIG. 3B)
Figure 3B:
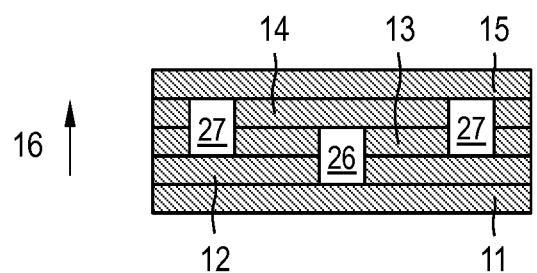

FIGS. 3A, 3B show a first and a second cross section of first component 10 from FIG. 1 in parallel to building direction 16 along section planes A-A in FIGS. 2A through 2E (FIG. 3A) and along section planes B-B in FIGS. 2A through 2E (FIG. 3B). Five cross-sectional areas 11 through 15 of first component 10 are arranged one above the other in building direction 16.

During the layered construction of first component 10, nine cavities are formed, into which insert elements are placed. The nine cavities may be divided into a first group of five first cavities 26 and a second group of four second cavities 27. First cavities 26 are arranged in second and third cross-sectional areas 12, 13 and are formed by second and third setting areas 19, 22; second cavities 27 are arranged in third and fourth cross-sectional areas 13, 14 and are formed by third and fourth setting areas 22, 24. FIG. 3A shows two first cavities 26 and one second cavity 27, and FIG. 3B shows one first cavity 26 and two second cavities 27.

In the exemplary embodiment of first component 10, first and second cavities 26, 27 have the same cross-sectional shape and the same insert height. Alternatively, first cavities 26 may have a first cross-sectional shape and a first insert height, and second cavities 27 may have a second cross-sectional shape and a second insert height which are different from each other. Different cross-sectional shapes and/or different insert heights for the first and second cavities are useful if different first and second insert elements are arranged in the first and second cavities.

Figure 4A:
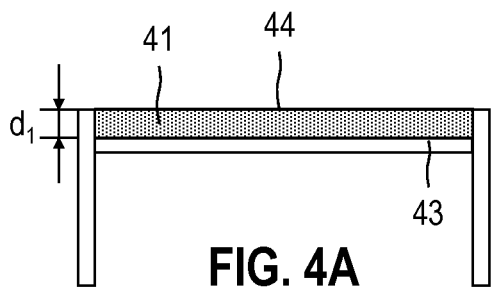
FIGS. 4A through 4T show the consecutive method steps of the method according to the present invention for the layered production of the first component from FIG. 1, including hard material particles arranged in a defined manner.
Figure 4B:
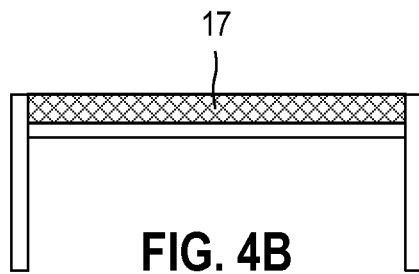
Figure 4C:
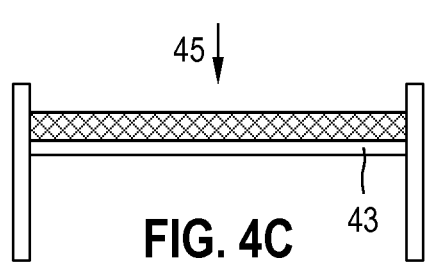
Figure 4D:
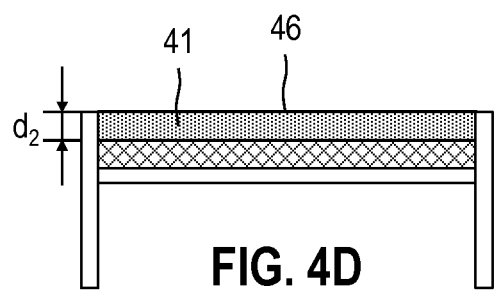
Figure 4E:
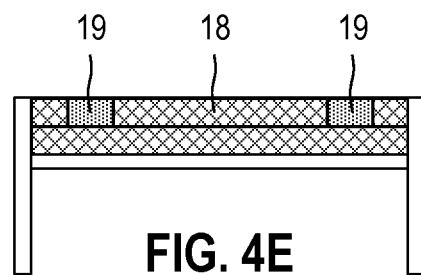
Figure 4F:
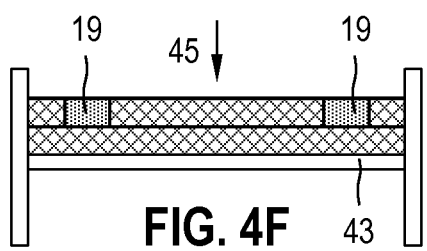
Figure 4G:
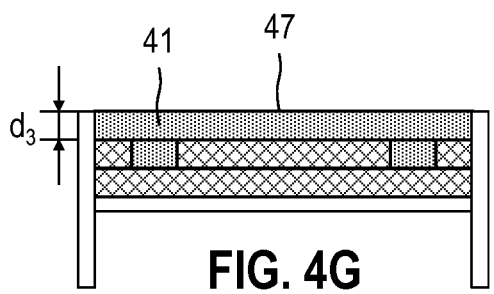
Figure 4H:
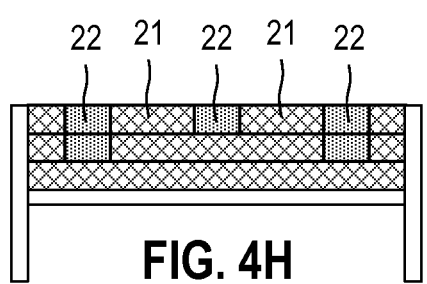
Figure 4I:
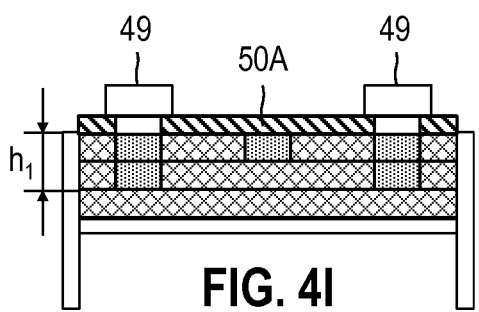
Figure 4J:
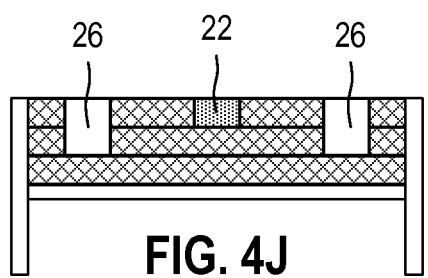
Figure 4K:
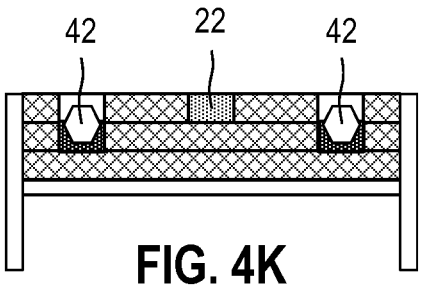
Figure 4L:
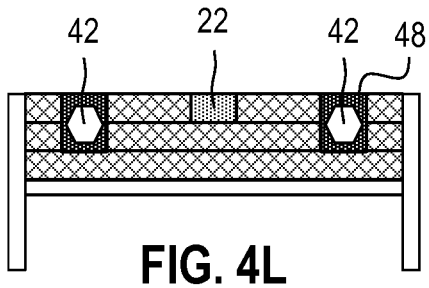
Figure 4M:
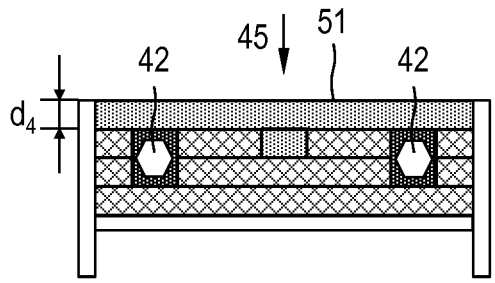
Figure 4N:
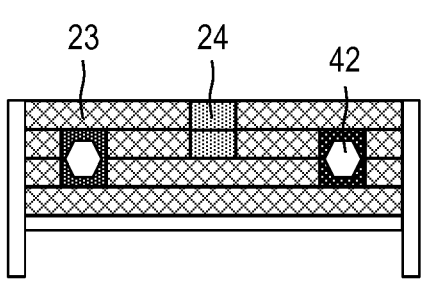
Figure 4O:
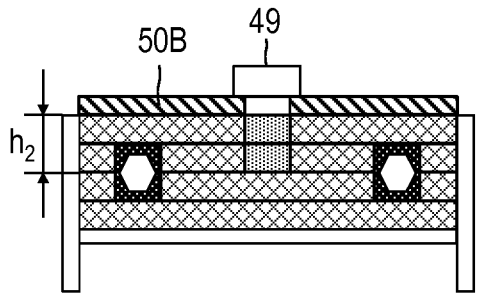
Figure 4P:
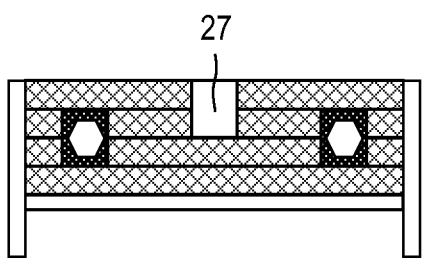
Figure 4Q:
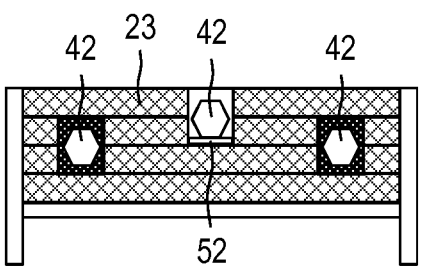
Figure 4R:
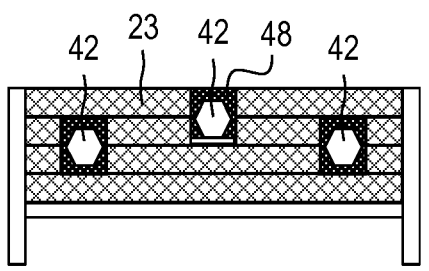
Figure 4S:
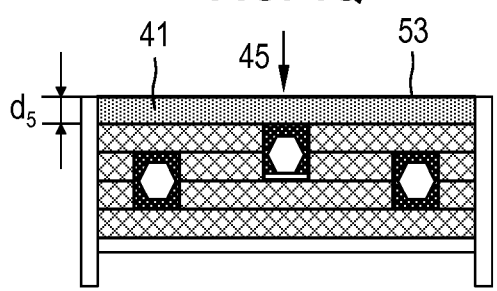
Figure 4T:
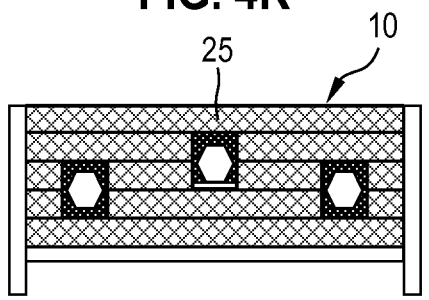

FIGS. 4A through 4T show the consecutive method steps of the method according to the present invention for the layered production of first component 10 of FIG. 1 from powdery material 41, including insert elements 42 arranged in a defined manner. First component 10 is designed as a green body and is compressed into a processing segment for an abrasive processing tool in a subsequent compression process, for example by hot pressing and/or sintering. First component 10 is manufactured from powdery material 41 and insert elements in the form of cutting elements, which are designed as individual hard material particles 42. Hard material particles 42 originate from a mixture of hard material particles, which are characterized by a minimum diameter $D_{min}$ and a maximum diameter $D_{max}$, 95% of the hard material particles being larger than minimum diameter $D_{min}$ and smaller than maximum diameter $D_{max}$.

First component 10 is manufactured in layers with the aid of a device, which includes a height-adjustable building plane 43, a powder feed unit and a print head. A first powder layer 44 of powdery material 41 having first layer thickness $d_1$ is applied with the aid of the powder feed unit (FIG. 4A). The print head applies a first adhesive layer in first material area 17, which binds the loose particles of first powder layer 44 in first material area 17 (FIG. 4B). Building plane 43 is lowered by second layer thickness $d_2$ in an adjusting direction 45 in parallel to building direction 16 (FIG. 4C), and a second powder layer 46 of powdery material 41 is applied with the aid of the powder feed unit (FIG. 4D). The print head applies a second adhesive layer in second material area 18, which binds the loose powder particles of second powder layer 46 in second material area 18, the powder particles not being bound in second setting areas 19 (FIG. 4E). Building plane 43 is lowered by third layer thickness $d_3$ in adjusting direction 45 (FIG. 4F), and a third powder layer 47 of powdery material 41 is applied with the aid of the powder feed unit (FIG. 4G). The print head applies a third adhesive layer in third material area 21, which binds the loose powder particles of third powder layer 47 in third material area 21, the powder particles not being bound in third setting areas 22 (FIG. 4H).

The insert height of first cavities 26 is reached after the application of the third powder and adhesive layers, and hard material particles 42 may be arranged in first cavities 26. The insert height of first cavities 26 is referred to below as first insert height $h_1$. In the exemplary embodiment, first insert height $h_1$ is greater than maximum diameter $D_{max}$ of hard material particles 42. A first insert height $h_1$, which is greater than maximum diameter $D_{max}$ of hard material particles 42, has the advantage that placed hard material particles 42 are almost completely arranged in first cavities 26, and the risk of hard material particles 42 being displaced during the application of another powder layer is greatly reduced. In addition, hard material particles 42 may be surrounded by a special material, which is different from powdery material 41. Due to the special material, hard material particles 42 may be protected against damage by chemical reactions with powdery material 41 in a subsequent compression process, for example with the aid of hot pressing or sintering. Cobalt powder or bronze powder, for example, are suitable as the special materials for hard material particles 42 in the form of diamond particles.

In the illustrated variant of the method according to the present invention, hard material particles 42 are surrounded by a special material 48. The loose powder particles of powdery material 41 are initially extracted in the area of first cavities 26 with the aid of an extraction unit 49 (FIG. 4I). For this purpose, a first template 50A is placed on the layer structure, which exposes first cavities 26, and the loose powder particles of powdery material 41 are removed from first cavities 26, for example by extraction by suction. After the extraction by suction of powdery material 41 (FIG. 4J), first cavities 26 are partially filled with special material 48 (see FIG. 4L) and hard material particles 42 are placed into first cavities 26 (FIG. 4K), and first cavities 26 are subsequently completely filled with special material 48 (FIG. 4L). This variant has the advantage that hard material particles 42 are completely surrounded by special material 48, and the risk of hard material particles 42 being damaged by a chemical bonding with powdery material 41 during the hot pressing and/or sintering being reduced as much as possible.

After first cavities 26 are completely filled with special material 48, the layer construction of first component 10 continues. Building plane 43 is lowered by fourth layer thickness $d_4$ in adjusting direction 45, and a fourth powder layer 51 of powdery material 41 is applied with the aid of the powder feed unit (FIG. 4M). The print head applies a fourth adhesive layer in fourth material area 23, which binds the loose powder particles of fourth powder layer 51 in fourth material area 23, the powder particles not being bound in fourth setting areas 24 (FIG. 4N).

The insert height of second cavities 27 is reached after the application of the fourth powder and adhesive layers, and cutting elements 42 may be placed into second cavities 27. The insert height of second cavities 27 is referred to below as second insert height $h_2$, second insert height $h_2$ being greater than maximum diameter $D_{max}$ of hard material particles 42. To protect hard material particles 42 arranged in second cavities 27 against damage by chemical reactions with powdery material 41, hard material particles 42 of second cavities 27 are embedded into special material 48, like hard material particles 42 of first cavities 26. The filling of second cavities 27 with hard material particles 42 and special material 48 may take place similarly to the two-part filling method of first cavities 26 illustrated in FIGS. 4J, 4K, 4L, in which a first part of special material 48 is filled before hard material particles 42 are placed, and a second part of special material 48 is filled after hard material particles 42 are placed.

To reduce the complexity in the layered production of first component 10, the two-part filling method of first and second cavities 26, 27 with special material 48 may be simplified. The alternative provides that hard material particles 42 are placed into cavities 26, 27 after the extraction of the loose powder particles, and cavities 26, 27 are filled with special material 48 after hard material particles 42 are placed. The alternative, which is referred to as the one-part filling method, is described on the basis of the example of second cavities 27. During production of components, the one-part or two-part filling method is generally used for special materials 48. The one-part filling method is described on the basis of second cavities 27 but may also be used in filling first cavities 26 with special materials 48.

The loose powder particles are extracted in the area of second cavities 27 with the aid of extraction unit 49 and a second template 50B, which exposes second cavities 27 (FIG. 4O). To ensure the orientation of hard material particles 42 in second cavities 27, an adhesive 52 may be used, which fastens hard material particles 42. The use of adhesive 52 has the advantage that the orientations and positions of hard material particles 42 are not changed during the application of another material layer or a special material. The properties of adhesive 52 used are adapted to powdery material 41, hard material particles 42 and/or special material 48. Second cavities 27 are filled with adhesive 52, hard material particles 42 are placed into adhesive 52 (FIG. 4Q) as long as adhesive 52 is not yet cured, and second cavities 27 are filled with special material 48 after adhesive 52 is cured (FIG. 4R). In the described one-part filling method, insert elements 42 are initially placed into second cavities 27, and second cavities 27 are subsequently filled with special material 48. Alternatively, in the one-part filling method, special material 48 is initially filled into second cavities 27, and insert elements 42 are subsequently placed into special material 48.

After second cavities 27 are filled with special material 48, the layer construction of first component 10 continues. Building plane 43 is lowered by fifth layer thickness $d_5$ in adjusting direction 45, and a fifth powder layer 53 of powdery material 41 is applied to building plane 43 with the aid of the powder feed unit (FIG. 4S). The print head applies a fifth adhesive layer in fifth material area 25, which binds the loose particles of fifth powder layer 53 in fifth material area 25 (FIG. 4T). After the loose powder particles in fifth material area 25 are bound, the layer construction of first component 10 is concluded. First component 10 is compressed into a processing segment for an abrasive processing tool in a subsequent compression process, for example by hot pressing and/or sintering.

First component 10 is manufactured in layers from five material areas 17, 18, 21, 23, 25 having same powdery material 41. Alternatively, the material areas of first component 10 may be manufactured from different powdery materials 41. In components which are further processed to processing segments for abrasive processing tools, for example a first powdery material may be used for the first material area, and a second powdery material may be used for the other material areas, the properties of the first powdery material being selected with regard to the connection of the processing segments to the base body, and the properties of the second powdery material being selected with regard to the mechanical connection of cutting elements 42. If the processing segments and the base body are to be welded, a weldable first powdery material is selected.

In first component 10, insert elements 42 are embedded into special material 48, the filling of first and second cavities 26, 27 taking place in a one-part or two-part filling method. Insert elements 42 do not have to be embedded into special material 48. Alternatively, insert elements 42 may be placed into first and second cavities 26, 27 in powdery material 41, powdery material 41 in this case being only partially removed from first and second cavities 26, 27. The use of a special material 48 is useful if first component 10 is subjected to a subsequent processing by hot pressing and/or sintering for compression purposes, and insert elements 42 become damaged during hot pressing and/or sintering, due to powdery material 41 used. Special material 48 is selected in such a way that it forms a chemical compound with powdery material 41 and mechanically binds insert elements 42.

Figure 5A:
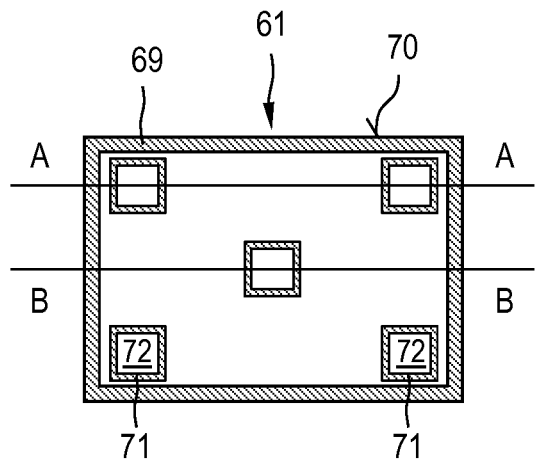
FIGS. 5A through 5E show five cylindrical cross-sectional areas of a second component, which is constructed on a substrate with the aid of the method according to the present invention for the layered production of a component.
Figure 5B:
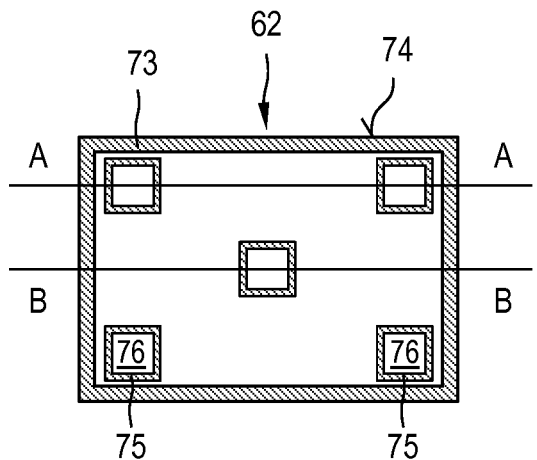
Figure 5C:
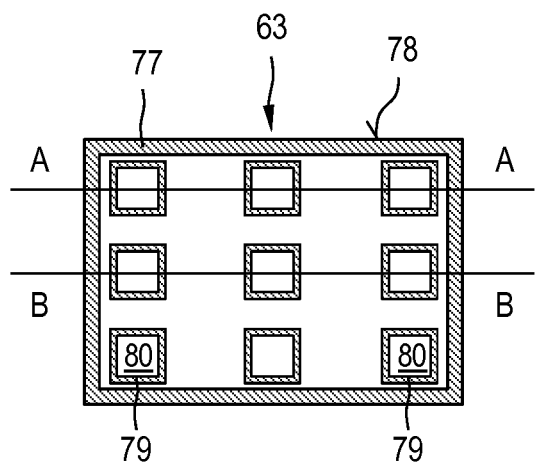
Figure 5D:
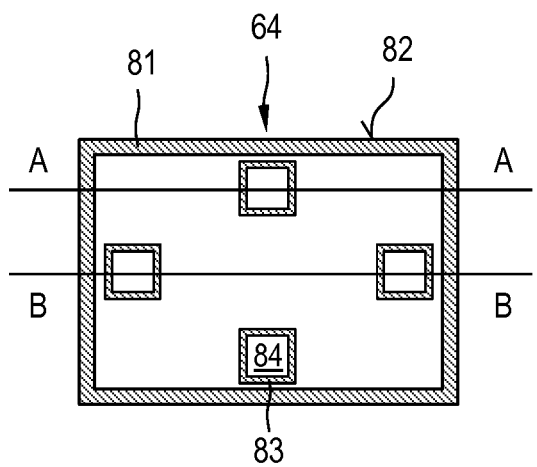
Figure 5E:
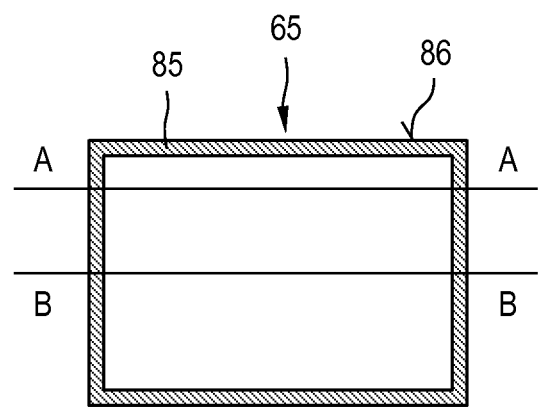

FIGS. 5A through 5E show another component 60, which is designed as a cuboid and is constructed from five cylindrical cross-sectional areas 61, 62, 63, 64, 65 arranged one on top of the other in a building direction 66 with the aid of the method according to the present invention for the layered production of a component. FIG. 5A shows first cross-sectional area 61, FIG. 5B shows second cross-sectional area 62, FIG. 5C shows third cross-sectional area 63, FIG. 5D shows fourth cross-sectional area 64, and FIG. 5E shows fifth cross-sectional area 65.

Component 60 is manufactured from a powdery material 67 and insert elements in the form of cutting elements, which are designed as individual hard material particles 42, and is referred to below as second component 60. Insert elements 42 are arranged in defined positions in second component 60, the distribution of insert elements 42 coinciding for first and second components 10, 60. While first cross-sectional area 11 forms the underside of first component 10, second component 60 is constructed on a substrate 68 as the underlying surface. Substrate 68 is, for example, a thin metal plate, which is connected to the base body of an abrasive processing tool in a subsequent processing process.

First cross-sectional area 61 includes a first outer ring 69 having a first outer lateral surface 70 and first support rings 71, which surround first setting areas 72. Second cross-sectional area 62 includes a second outer ring 73 having a second outer lateral surface 74 and second support rings 75, which surround second setting areas 76. Third cross-sectional area 63 includes a third outer ring 77 having a third outer lateral surface 78 and third support rings 79, which surround third setting areas 80. Fourth cross-sectional area 64 includes a fourth outer ring 81 having a fourth outer lateral surface 82 and fourth support rings 83, which surround fourth setting areas 84. Fifth cross-sectional area 65 includes a fifth outer ring 85 having a fifth outer lateral surface 86.

Outer rings 69, 73, 77, 81, 85 of cross-sectional areas 61 through 65 are designed in the form of a rectangular cylinder and separate second component 60 from surrounding powdery material 67. In the exemplary embodiment, setting areas 72, 76, 80, 84 have a square design and are surrounded by square support rings 71, 75, 79, 83. Instead of closed, square support rings 71, 75, 79, 83, other closed cross-sectional shapes may be used for the support rings.

Figure 6A:
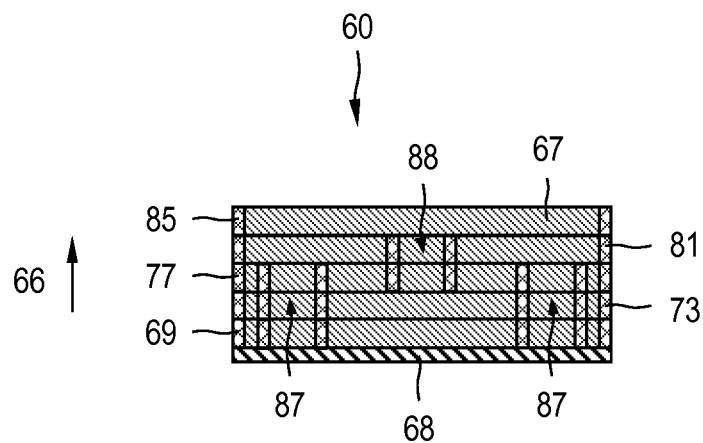
FIGS. 6A, 6B show a first and a second cross section of the second component in parallel to the building direction along section planes A-A in FIGS. 5A through 2E (FIG. 6A) and along section planes B-B in FIGS. 5A through 2E (FIG. 6B)
Figure 6B:
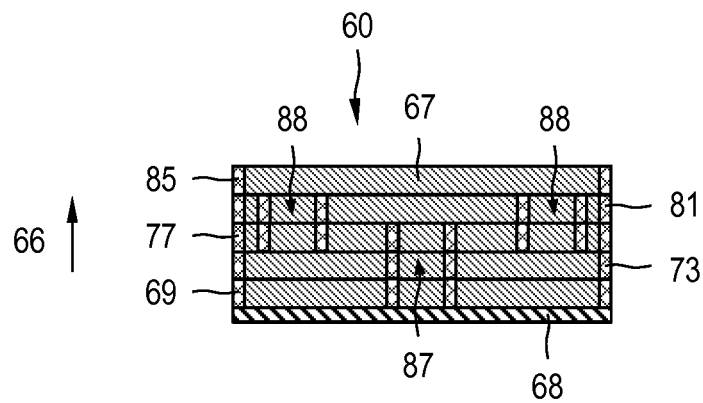

FIGS. 6A, 6B show a first and a second cross section of second component 60 in parallel to building direction 66 along section planes A-A in FIGS. 5A through 5E (FIG. 6A) and along section planes B-B in FIGS. 5A through 5E (FIG. 6B). Five cross-sectional areas 61 through 65 of second component 60 are arranged one above the other in building direction 66.

In the layer construction of second component 60, an outer geometry is created, which prevents an emergence of powdery material 67 from second component 60. The outer geometry of second component 60 is formed by substrate 68 and outer rings 69, 73, 77, 81, 85. Substrate 68 is connected to first outer ring 69, first outer ring 69 is connected to second outer ring 73, second outer ring 73 is connected to third outer ring 77, third outer ring 77 is connected to fourth outer ring 81, and fourth outer ring 81 is connected to fifth outer ring 85.

Second component 60 includes five first support structures 87 and four second support structures 88. First support structures 87 are constructed from first, second and third support rings 71, 75, 79 and have a first insert height $h_1$. Second support structures 88 are constructed from first, second, third and fourth support rings 71, 75, 79, 83 and have a second insert height $h_2$. First and second support structures 87, 88 are connected to substrate 68 and are fixed securely thereby in second component 60. To construct first support structures 87, first support rings 71 are connected to substrate 68, second support rings 75 are connected to first support rings 71, and third support rings 79 are connected to second support rings 75. To construct second support structures 88, first support rings 71 are connected to substrate 68, second support rings 75 are connected to first support rings 71, third support rings 79 are connected to second support rings 75, and fourth support rings 83 are connected to third support rings 79.

FIGS. 7A through 7M show the consecutive method steps of the method according to the present invention for the layered production of second component 60 from powdery material 67, including insert elements arranged in a defined manner, which are designed as individual hard material particles 42. Second component 60 is compressed into a processing segment for an abrasive processing tool in a subsequent compression process, for example by hot pressing and/or sintering.

Figure 7A:
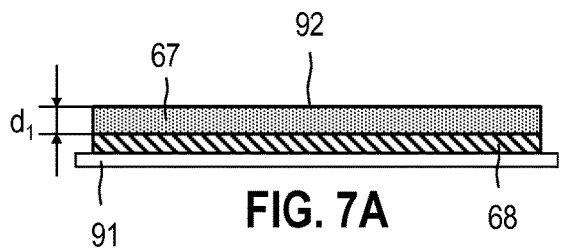
FIGS. 7A through 7M show the consecutive method steps of the method according to the present invention for the layered production of the second component, including hard material particles arranged in a defined manner.
Figure 7B:
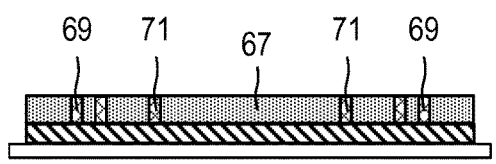

Second component 60 is manufactured in layers with the aid of a device, which includes a building plane 91, a powder feed unit and a print head. A first powder layer 92 of powdery material 67 having first layer thickness $d_1$ is applied with the aid of the powder feed unit (FIG. 7A). In the area of first outer ring 69 and first support rings 71, the print head applies adhesive, which bonds the loose powder particles of powdery material 67 to first outer ring 69 and first support rings 71 (FIG. 7B).

Figure 7C:
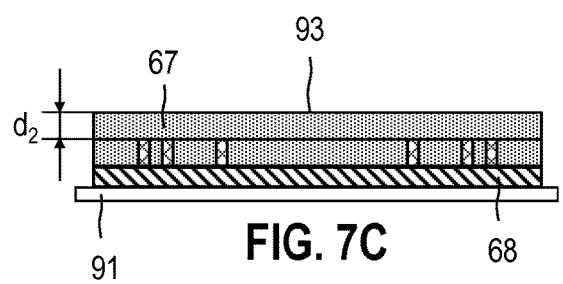
Figure 7D:
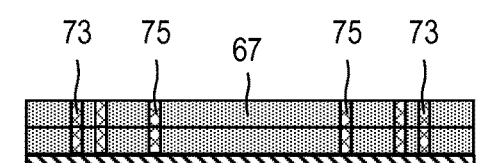
Figure 7E:
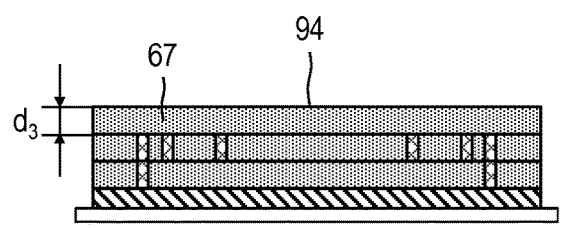
Figure 7F:
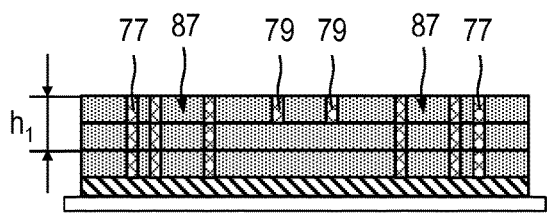

A second powder layer 93 of powdery material 67 having second layer thickness $d_2$ is applied with the aid of the powder feed unit (FIG. 7C). In the area of second outer ring 73 and second support rings 75, the print head applies adhesive, which bonds the loose powder particles of powdery material 67 to second outer ring 73 and second support rings 75 (FIG. 7D). A third powder layer 94 of powdery material 67 having third layer thickness $d_3$ is applied with the aid of the powder feed unit (FIG. 7E). In the area of third outer ring 77 and third support rings 79, the print head applies adhesive, which bonds the loose powder particles of powdery material 67 to third outer ring 77 and third support rings 79 (FIG. 7F).

Figure 7G:
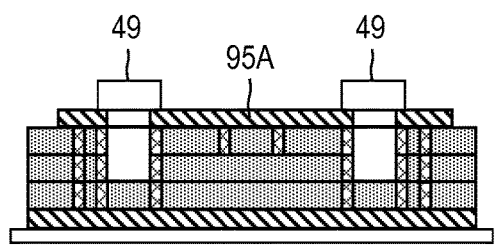

First insert height $h_1$ of first support structures 87 is reached after the completion of third cross-sectional area 63, and hard material particles 42 may be placed into first support structures 87. The loose powder particles of powdery material 67 are initially extracted in the area of first support structures 87 with the aid of extraction unit 49 (FIG. 7G). For this purpose, a first template 95A is placed on the layer structure, which exposes first support structures 87, and the loose powder particles of powdery material 67 are removed from first support structures 87 with the aid of extraction unit 49. The extraction height may be set via the extraction force of extraction unit 49.

Figure 7H:
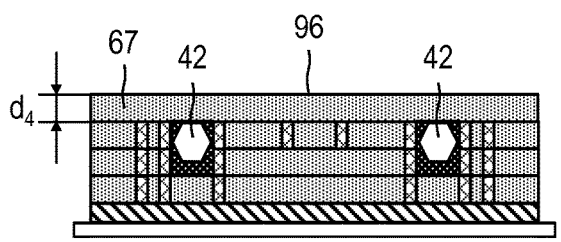
Figure 7I:
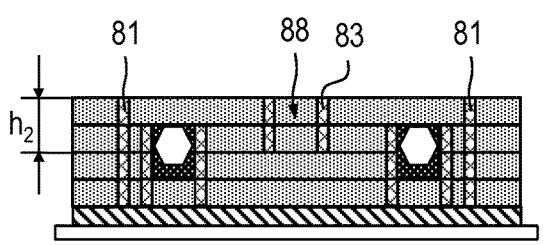

After powdery material 67 has been extracted, first support structures 87 are filled with special material 48, hard material particles 42 are placed within first support structures 87, and a fourth powder layer 96 of powdery material 67 having fourth layer thickness $d_4$ is applied with the aid of the powder feed unit (FIG. 7H). In the area of fourth outer ring 81 and fourth support rings 83, the print head applies adhesive, which bonds the loose powder particles of powdery material 67 to fourth outer ring 81 and fourth support rings 83 (FIG. 7I).

Figure 7J:
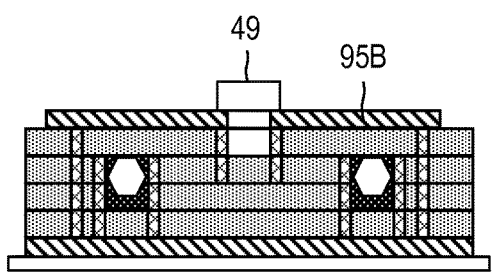

Second insert height $h_2$ of second support structures 88 is reached after the completion of fourth cross-sectional area 64, and hard material particles 42 may be placed into second support structures 88. The loose powder particles of powdery material 67 are initially extracted in the area of second support structures 88 with the aid of extraction unit 49 (FIG. 7J). For this purpose, a second template 95B is placed on the layer structure, which exposes second support structures 88, and the loose powder particles of powdery material 67 are partially removed from second support structures 88 with the aid of extraction unit 49. The extraction height may be set via the extraction force of extraction unit 49. In the exemplary embodiment, powdery material 67 is extracted over half of second insert height $h_2$, and approximately 50% of powdery material 67 remains in second support structures 88.

Figure 7K:
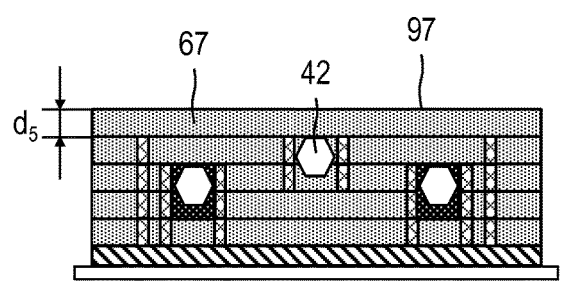
Figure 7L:
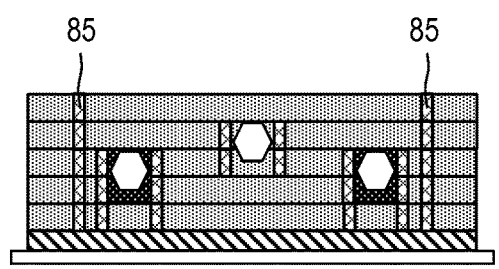
Figure 7M:
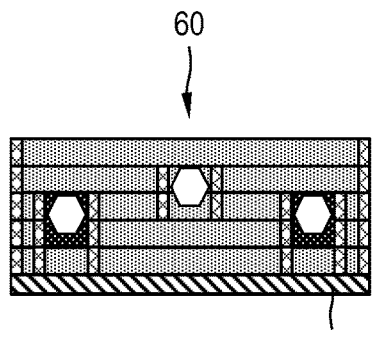

After powdery material 67 has been partially extracted, hard material particles 42 are placed within second support structures 88 and a fifth powder layer 97 of powdery material 67 having fifth layer thickness $d_5$ is applied with the aid of the powder feed unit (FIG. 7K). In the area of fifth outer ring 85, the print head applies adhesive, which bonds the loose powder particles of powdery material 67 to fifth outer ring 85 (FIG. 7L). FIG. 7M shows second component 60 manufactured in layers from powdery material 67, including multiple insert elements 42 arranged in a defined manner.

Second component 60 is manufactured in layers from five powder layers 92, 93, 94, 96, 97 having same powdery material 67. Alternatively, five powder layers 92, 93, 94, 96, 97 of second component 60 may be manufactured from different powdery materials 67. In components which are further processed into processing segments for abrasive processing tools, for example a first powdery material may be used for the first powder layer 92, and a second powdery material may be used for other powder layers 93, 94, 96, 97, the properties of the first powdery material being selected with regard to the connection of the processing segments to the base body, and the properties of the second powdery material being selected with regard to the mechanical connection of insert elements 42. If the processing segments including the base body are to be welded, a weldable first powdery material is selected.

The outer geometry of second component 60 in fifth cross-sectional area 65 is designed to be upwardly open, so that second component 60 must be transported upright for a subsequent compression process. To outwardly delimit second component 60 in fifth cross-sectional area 65 as well, fifth cross-sectional area 65 may alternatively form a cover element, which is connected to fourth outer ring 81. For this purpose, the print head applies an adhesive layer in fifth cross-sectional area 65, which bonds the loose particles of powdery material 67 to the cover element.

First and second support structures 87, 88 have closed cross-sectional shapes, but are designed to be downwardly open. To prevent extraction unit 49 from extracting too much powdery material 67 from first and second support structures 87, 88, the extraction force of extraction unit 49 is set accordingly. Alternatively, first and second support structures 87, 88 may have a base surface on their underside, which separates first and second support structures 87, 88 from surrounding powdery material 67.

The invention claimed is:

1. A method for layered production of an abrasive processing tool component from powdery material including loose powder particles, based on three-dimensional data of the component, the method comprising the steps of:

segmenting the component in a building direction into N, N≥2, consecutive, cylindrical cross-sectional areas, each cross-sectional area being formed from a two-dimensional cross-sectional surface perpendicular to the building direction and a layer thickness parallel to the building direction;

applying a first powder layer of powdery material to a building plane perpendicularly to the building direction;

at least partially bonding the loose powder particles of the first powder layer to each other in the first cross-sectional area of the component;

applying additional powder layers of the powdery material consecutively to the building plane in the building direction;

at least partially bonding the loose powder particles in the particular cross-sectional area of the component to each other and to the underlying cross-sectional area of the component in each of the additional powder layers of the powdery material;

at least partially removing the loose powder particles arranged within one cross-sectional area or within multiple consecutive cross-sectional areas in the building direction from the component during the layered production of the component, cavities for cutting elements being constructed in layers in the component; and placing the cutting elements within the cavities during the layered production.

2. The method as recited in claim 1 wherein setting areas for cutting elements are defined in the component, and the loose powder particles of the powdery material surrounding the setting areas are bonded to each other.

3. The method as recited in claim 1 wherein material areas are defined in addition to the setting areas for the cross-sectional areas of the component including the setting areas, and further materials areas are defined for the cross-sectional areas of the component not including any of the setting areas, the loose powder particles of the powdery material in the material area and the further material areas being bonded to each other, the material areas and the further material areas delimiting the cavities for the cutting elements.

4. The method as recited in claim 1 wherein the loose powder particles of the powdery material are at least partially removed from a first cavity of the cavities when the first cavity has a necessary insert height for placing the cutting insert elements.

5. The method as recited in claim 2 wherein closed support structures for the insert elements are constructed in layers in the component, and the cutting elements are placed within the closed support structures during the layered production.

6. The method as recited in claim 5 wherein support rings are defined for the cross-sectional areas of the component including the setting areas, the support rings surrounding the setting areas.

7. The method as recited in claim 5 wherein the loose powder particles of the powdery material are at least partially removed from a first support structure of the support structures when the first support structure has a necessary insert height for placing the cutting elements.

8. The method as recited in claim 1 wherein the cutting elements include a natural material.

9. The method as recited in claim 8 wherein the natural material is diamond or corundum.

10. The method as recited in claim 9 wherein the cutting elements include a synthetic material.

11. The method as recited in claim 10 wherein the synthetic material include synthetic diamonds, high-melting carbides, borides, nitrides or silicides.

12. The method as recited in claim 1 wherein the cutting elements include metallic material.

13. The method as recited in claim 12 wherein the metallic material includes carbides, borides, nitrides and silicides of transition metals of the fourth through the sixth group of the periodic system.

14. The method as recited in claim 1 wherein the cutting elements include a non-metallic material.

15. The method as recited in claim 14 wherein the nonmetallic material includes diamond, corundum, silicon carbide or boron carbide.

16. The method as recited in claim 1 further comprising partially filling the cavities with a different material different from the powdery material, the placing of the cutting elements within the cavities including placing the cutting elements on the different material, and then completely filling the cavities with the different material to fully surround the cutting elements within the cavities.

17. The method as recited in claim 16 wherein the different material is cobalt or bronze powder.

* * * * *